United States Patent [19]
Getschel

[11] Patent Number: 5,347,744
[45] Date of Patent: Sep. 20, 1994

[54] FISHING LURE

[76] Inventor: Glen Getschel, 1102 - 110th St., Amery, Wis. 54001

[21] Appl. No.: 86,536

[22] Filed: Jul. 1, 1993

[51] Int. Cl.5 .............................................. A01K 85/00
[52] U.S. Cl. .................................. 43/42.36; 43/42.15
[58] Field of Search ................. 43/42.36, 42.05, 42.15, 43/42.31

[56] References Cited

U.S. PATENT DOCUMENTS

| | | | |
|---|---|---|---|
| 1,754,567 | 4/1930 | Newell | 43/42.05 |
| 2,494,407 | 1/1950 | Rhodes | 43/42.36 |
| 2,617,226 | 11/1952 | Yoshii | 43/42.36 |
| 3,417,503 | 12/1968 | Meulnart | 43/42.36 |
| 4,942,689 | 7/1990 | Link | 43/42.36 |
| 5,040,325 | 8/1991 | Herrmann | 43/42.36 |
| 5,197,220 | 3/1993 | Gibbs | 43/42.36 |

*Primary Examiner*—Kurt C. Rowan
*Attorney, Agent, or Firm*—Robert A. Elwell; Harold D. Jastram; Jennifer K. Farrar

[57] ABSTRACT

A fishing lure comprising a dense body portion having a bore therethrough; a recess formed in the body portion, the recess communicating with the bore, the recess sized to accommodate and receive the eyelet of a hook, said recess having non-resilient walls and a mouth; and a resilient obstruction adjacent the mouth of the recess, the resilient obstruction inhibiting passage of the eyelet of the hook until a force is exerted upon the eyelet to cause the resilient obstruction to yield and allow passage of the eyelet. Additionally, a fishing lure assembly, for ordered array upon an fishing line terminating at an eyelet of a fishhook, the lure including a forward piece having a bore and a rearward directed semi-spherical recess; a generally spherical bead having a bore and a spherical radius slightly smaller than the radius of the recess of the first piece; and a rearward piece having a bore, a forward directed semi-spherical recess of a radius slightly greater than the bead, and having rearward directed means for releaseably holding a fishhook eyelet.

15 Claims, 1 Drawing Sheet

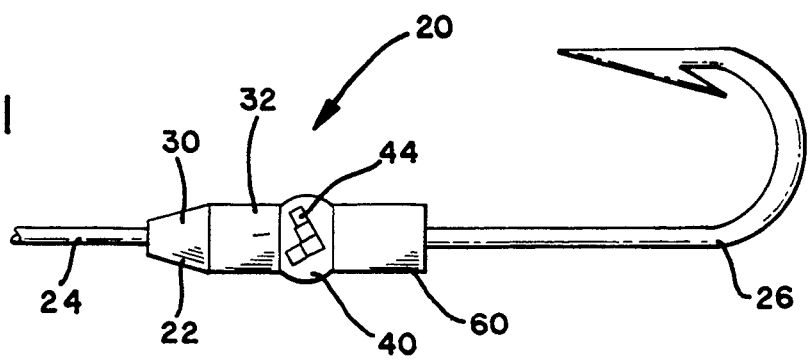
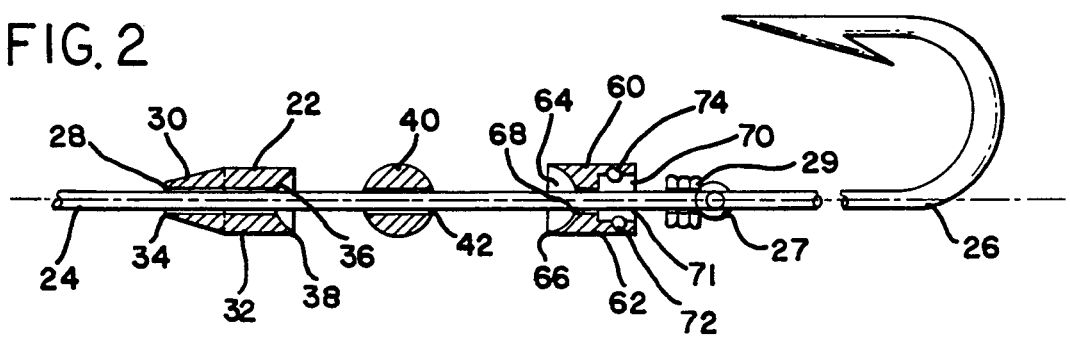

＃ FISHING LURE

BACKGROUND OF THE INVENTION

The present invention relates to fishing lures, and in particular, sound-producing fishing lures. The present invention also relates to fishing lures designed for use with live bait, such as for example, worms.

It is well known to fish with a worm impaled upon a traditional fishing hook. It is also well known to incorporate a weight on or near the fishing hook/worm combination in order to appropriately locate the worm and hook at the bottom of a water body thereby increasing the chances of catching a fish. One method of weighting such a hook has been the attachment of a weight adjacent the hook. However, such an arrangement is plagued by the disadvantage that a fish, beginning to take the bait, has to lift the weight and thus may be scared away from being hooked. The traditional answer to such a problem has been to provide a weight with a aperture through which a fishing line is attached to the hook. As the fish attempts to take the worm, the line slides freely through the aperture of the lure and the fish does not easily detect the situation. Occasionally, fishermen desire to maintain the fixed connection between the weight and the hook and thus will force a small piece of wood, such as a toothpick, into the hole of the weight forcing the line against the outer wall of the aperture and preventing any slide of the weight upon the fishing line. Such a process is known as "pegging." Pegging, however, tends to generate a flat or weakened portion on the fishing line, thus increasing the possibility of a break in the line under tension when a fish is being caught. A more recent solution to provide reversible, fixed attachment to a fishing hook is disclosed in the Link U.S. Pat. No. 4,942,689. The Link patent discloses a fishing weight with an aperture and a rear recess. The recess is substantially filled with a rubbery material and within the rubbery material is a cavity having two openings. One of the openings communicates with the through aperture and the other opening restricts passage of the eyelet of the fishhook. In this manner, the eyelet of a fishhook may be inserted in the cavity thereby forming the fixed relationship between the hook and the weight, or alternatively, the fishermen may extract the eyelet from the cavity thereby creating a sliding relationship of the weight upon the fishing line and allowing the hook to be pulled free by a fish. One distinct disadvantage of the Link invention is that the outward opening of the rubberized cavity may become worn or torn by repeated usage. This, in turn, causes the ability of the weight to be "pegged" to the hook to be lost.

It is also desirable in the fishing lure industry to increase the attractiveness of lures by incorporating the ability to generate a sound. To the best of the inventor's knowledge, the combination of a peggable weight and sound production have not previously been combined in a single fishing lure.

SUMMARY OF THE INVENTION

The present invention includes a fishing lure, including a dense body having a bore through the body, a recess formed in the body portion, the recess communicating with the bore, and sized to accommodate and receive the eyelet of a fishing hook, and a resilient obstruction, the obstruction inhibiting passage of an eyelet of a hook until force is exerted upon said eyelet to cause the resilient obstruction to yield and allow passage of the eyelet into or out of the recess. In a preferred embodiment, the lure is radially symmetrical about the bore, the recess is a cylindrical bore greater in diameter than the axial bore, and the obstruction is an O-ring seated in a groove in the recess. Exerting force on the eyelet causes the resilient obstruction to yield and allow passage of the eyelet into or out of the recess.

Additionally, the present invention is a fishing lure which includes a forward or nose piece, a bead and a rearward piece including means for reversibly linking to the eyelet of a fishhook. The forward piece has a bore and a rearward-directed, semi-spherical recess. The second piece is a generally spherical bead with a bore and a radius slightly smaller than the radius of the recess of the first piece. The rearward piece has a bore and a forward directed semi-spherical recess of radius slightly smaller than the bead and has a rearward-directed means for releasably holding a fishhook eyelet. Preferably, the bead is formed of plastic and has a facetted waist. Preferably, the forward piece has a generally conical nose portion. Preferably, the forward and rearward pieces are formed of a dense material, with a density greater than 1.0 such as, for example, brass. When the lure is shaken under water it produces a noise which simulates the sound of a crawfish.

BRIEF DESCRIPTION OF THE DRAWINGS

FIG. 1 is a plan view of the present invention, and;

FIG. 2 is an exploded longitudinal cross-sectional view similar to FIG. 1 with fishing line and hook shown in full.

DETAILED DESCRIPTION OF THE PREFERRED EMBODIMENTS

In a first embodiment, the present invention is a fishing lure 20 as shown in FIG. 1. The lure 20 has a forward piece 22, a generally spherical bead 40, and a rearward piece 60. The forward piece 22, bead 40 and rearward piece 60 are utilized as an ordered array upon a fishing line 24 terminating in a hook 26. As will be subsequently discussed, the hook is optionally and releasably attached to the third piece 60. The forward piece 22 and bead 40 tend to remain loosely arrayed upon the fishing line 24 except when the lure is pulled quickly through water.

When the lure 20 is shaken, for example, by repetitive lateral movement of fishing line 24, the bead 40 repetitively interacts with and rattles against the forward piece 22 and/or the rearward piece 60 to provide a noise simulating the noise of a crawfish. Such a noise can be highly attractive to a fish. Additionally, it is envisioned that the hook 26 will carry a bait, such as an artificial or natural bait, such as for example, a live or plastic worm, a minnow, a leach, etc. The combination of the bait and the noise produced by the interaction of the bead 40 with the forward piece 22 and or the rearward piece 60 is highly effective in attracting the attention of fish and thereby increasing the efficiency of the fisherman.

In a preferred embodiment, the forward piece 22 is formed of a dense material, with a density greater than 1.0, preferably brass or other suitable dense metals are employed. Although lead may be employed, brass is preferred since it is more resistant to mechanical damage. The forward piece 22 has a bore 28 extending through the center of the forward piece 22. There is radial symmetry about the bore 28. The forward piece 22 has a generally conical nose portion 30 and a cylindrical wall 32. The forward most portion 34 of the nose 30 is slightly rounded to prevent any sharp edges from contacting the fishing line 24. A semi-spherical recess 36 is located on the rearmost portion of the forward piece 22. The intersection 38 of the semi-spherical recess 36 and the cylindrical wall 32 is slightly rounded again to prevent any opportunity to cut or damage the fishing line 24. Preferably, the radius of the rounded surfaces should be at least 0.01 inch radii minimally and most preferably 0.02 inch radii. In a preferred embodiment, the radius of the semi-spherical recess is approximately 0.16 inches.

The bead 40 is preferably formed of plastic, especially a translucent plastic and most preferably of red transparent plastic, such as for example, styrene. The bead 40 also includes a through bore 42 and additionally, has a facetted waist 44. The through bore 42 is radially symmetrically located within the bead 40. The facetted waist 44 is also radially symmetrically situated upon the bead 40.

The rearward piece 60 is also formed of a dense material, preferably a material having a density of greater than 1.0 and most preferably formed of a dense metal such as brass. Brass is again preferred to softer metal such as lead in that it is more resistant to mechanical damage. The rearward piece 60 has a generally cylindrical outer wall 62 a forwardly-directed, semi-spherical recess 64 which intersects the cylindrical surface 60 at an edge 66. The intersection or edge 66 is generally rounded to at least a 0.01 inch radius, and preferably 0.02 radius to avoid any possible damage to the fishing line 24. The rearward piece additionally includes a through bore 68 communicating between the semi-spherical recess 64 and a rearward situated bore 70. The bore 70 has a radius of approximately 0.09 inches and communicates with the bore 68. The bore 70 is also capable of receiving the eyelet 27 on the shank of hook 26 and may alternatively be described as a recess or receiver. The eyelet is joined to the fishing line 24 by a traditional knot 29. Within the recess 70 adjacent a rearward mouth 71, is a groove 72 carrying an O-ring 74. The O-ring 74 resiliently obstructs passage of the eyelet 27 into or out of the receiver 70. By application of a moderate force, the eyelet 27 of the fishhook 26 may be releasably captured within the bore 70. By application of a withdrawing force the eyelet 27 may be withdrawn from the receiver 70.

Although the present invention has been described with reference to the preferred embodiments, workers skilled in the art will recognize that changes may be made in form and detail without departing from the spirit and scope of the invention.

What is claimed is:

1. A fishing lure comprising:
  a dense body portion having a bore therethrough, the body portion being radially symmetrical with respect to the bore
  a recess formed in said body portion, said recess communicating with said bore, said recess sized to accommodate and receive the eyelet of a hook, said recess having non-resilient walls and a mouth, and being radially symmetrical with respect to the bore,
  an O-ring seated in a groove adjacent the mouth of the recess and resiliently obstructing the mouth of the recess, said O-ring inhibiting passage of an eyelet of a hook until a force is exerted upon said eyelet to cause the resilient O-ring to yield and allow passage of the eyelet,
  a second recess facing opposite the first recess and
  a generally spherical bead, having an axial bore and sized to be received into the second recess of the lure.

2. The lure of claim 1 and further comprising:
  an elongated nose portion, said nose portion having an axial bore, a tapered nose and a recess receptive a forward portion of the generally spherical bead.

3. The lure of claim 2 and wherein the bead has a faceted waist.

4. The lure of claim 2 and wherein the lure rattles or clicks when shaken.

5. The lure of claim 2 and further comprising a fish hook, the fish hook having an eyelet for reversible association with the resiliently obstructed recess.

6. A fishing lure assembly, for ordered array upon an fishing line terminating at an eyelet of a fishhook, the lure comprising:
  a forward piece, having a bore and a rearward directed semi-spherical recess;
  a generally spherical bead, the bead having a bore and a spherical radius slightly smaller than the radius of the recess of the first piece; and
  a rearward piece, the rearward piece having a bore and a forward directed semi-spherical recess of a radius slightly greater than the bead and having rearward directed means for releaseably holding a fishhook eyelet.

7. The lure assembly of claim 6 and wherein the means for releasably holding include a recess having a mouth and means for resiliently obstructing the mouth opening.

8. The lure of claim 7 and wherein the bead is plastic.

9. The lure of claim 8 and wherein the bead has a faceted waist.

10. The lure of claim 6 and wherein the forward piece has a generally conical nose.

11. The lure of claim 6 and wherein the density of the rearward piece is greater than 1.0.

12. The lure of claim 6 and wherein the density of the forward piece is greater than 1.0.

13. The lure of claim 11 and wherein the rearward piece is formed of brass.

14. The lure of claim 6 and wherein the forward piece is formed of brass.

15. The lure of claim 6 and wherein shaking the lure produces a noise simulating a crawfish.

* * * * *